United States Patent
Felt et al.

(10) Patent No.: US 11,159,953 B2
(45) Date of Patent: Oct. 26, 2021

(54) SYSTEMS AND METHODS FOR QUALIFYING A NETWORK SERVICE FOR EACH UNIT OF A MULTI-UNIT BUILDING

(71) Applicant: Verizon Patent and Licensing Inc., Arlington, VA (US)

(72) Inventors: Michelle Felt, Randolph, NJ (US); Rajat Sharma, Southlake, TX (US); Vipul Jha, Plano, TX (US); Sheikbharith Liakathali, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/694,873

(22) Filed: Nov. 25, 2019

(65) Prior Publication Data

US 2021/0160701 A1 May 27, 2021

(51) Int. Cl.
| | |
|---|---|
| *H04W 40/00* | (2009.01) |
| *H04W 16/18* | (2009.01) |
| *H04W 24/08* | (2009.01) |
| *G06Q 30/02* | (2012.01) |
| *G06Q 30/06* | (2012.01) |
| *H04W 24/04* | (2009.01) |

(52) U.S. Cl.
CPC ........ *H04W 16/18* (2013.01); *G06Q 30/0203* (2013.01); *G06Q 30/0601* (2013.01); *H04W 24/04* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 6,336,035 B1* | 1/2002 | Somoza | H04W 16/18 455/423 |
| 2009/0043666 A1* | 2/2009 | Malik | G06Q 10/087 705/26.8 |
| 2009/0045939 A1* | 2/2009 | Holland | H04W 24/00 340/524 |
| 2009/0063525 A1* | 3/2009 | Vangati | H04L 67/36 |
| 2015/0227893 A1* | 8/2015 | Huynh | G06Q 40/08 705/4 |
| 2018/0027423 A1* | 1/2018 | Greenberger | H04W 40/244 455/446 |
| 2020/0005266 A1* | 1/2020 | Gruen | G06Q 20/045 |

* cited by examiner

*Primary Examiner* — Jinsong Hu
*Assistant Examiner* — Alexander J Yi

(57) ABSTRACT

A device may capture property data identifying units associated with a multi-unit building, and may import an image of a floor plan associated with the multi-unit building. The device may provide the property data to a network device associated with a network that provides network coverage to the multi-unit building, and may receive, from the network device, network coverage data for the multi-unit building. The device may combine the image of the floor plan and the network coverage data to generate an image identifying the floor plan and the network coverage for the multi-unit building, and may capture signal reception data identifying a strength of signal from the network for one or more units of the multi-unit building. The device may perform one or more actions based on the signal reception data and the image identifying the floor plan and the network coverage.

20 Claims, 15 Drawing Sheets

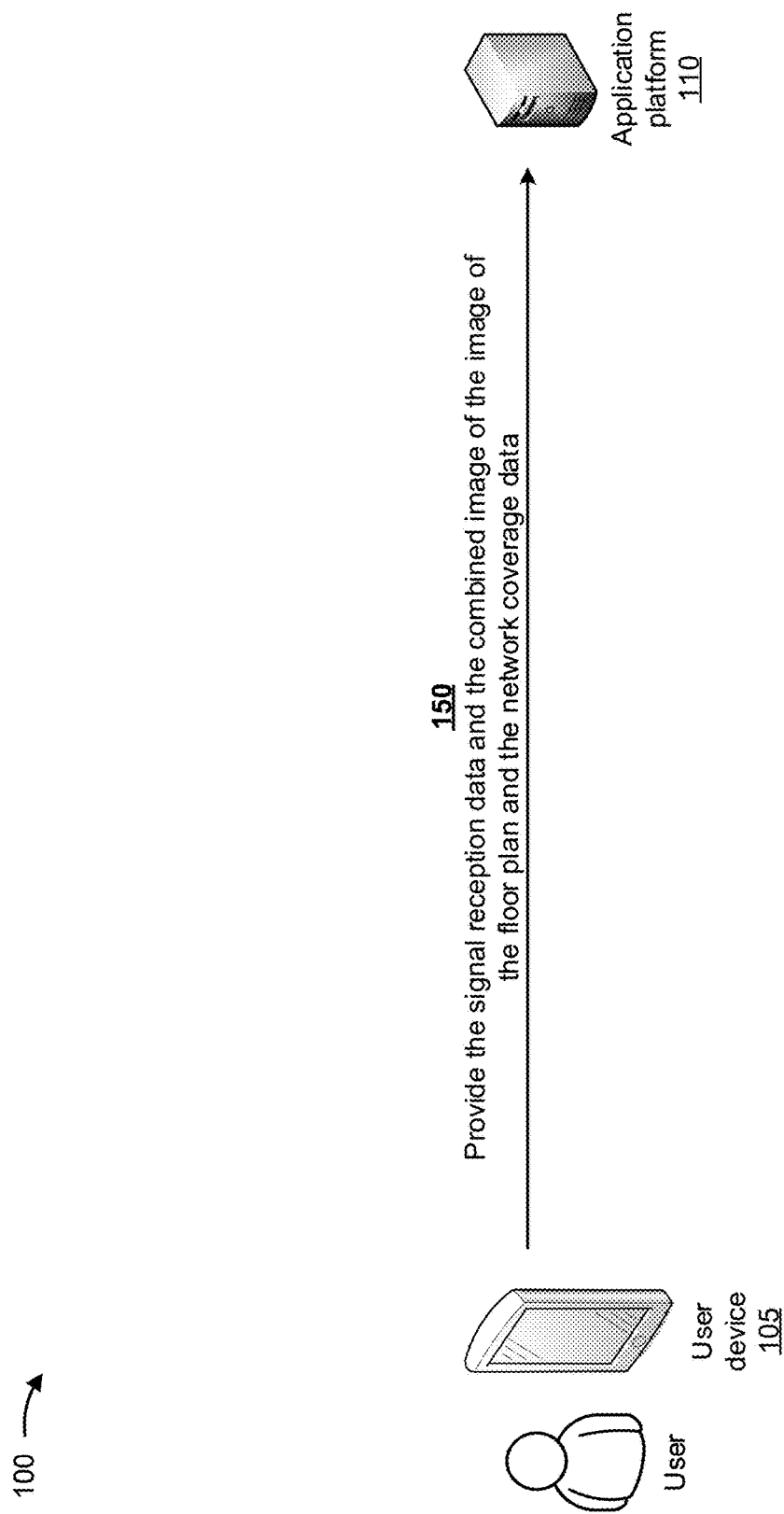

SYSTEMS AND METHODS FOR QUALIFYING A NETWORK SERVICE FOR EACH UNIT OF A MULTI-UNIT BUILDING

BACKGROUND

A network service (e.g., Internet access) may be provided via a wireless network (e.g., a fifth generation (5G) wireless network) to a customer residing in a home, to multiple customers residing in units (e.g., apartments, condominiums, and/or the like) of a multi-unit building, and/or the like.

BRIEF DESCRIPTION OF THE DRAWINGS

FIGS. 1A-1L are diagrams of one or more example implementations described herein.

DETAILED DESCRIPTION OF PREFERRED EMBODIMENTS

Figure 1A:
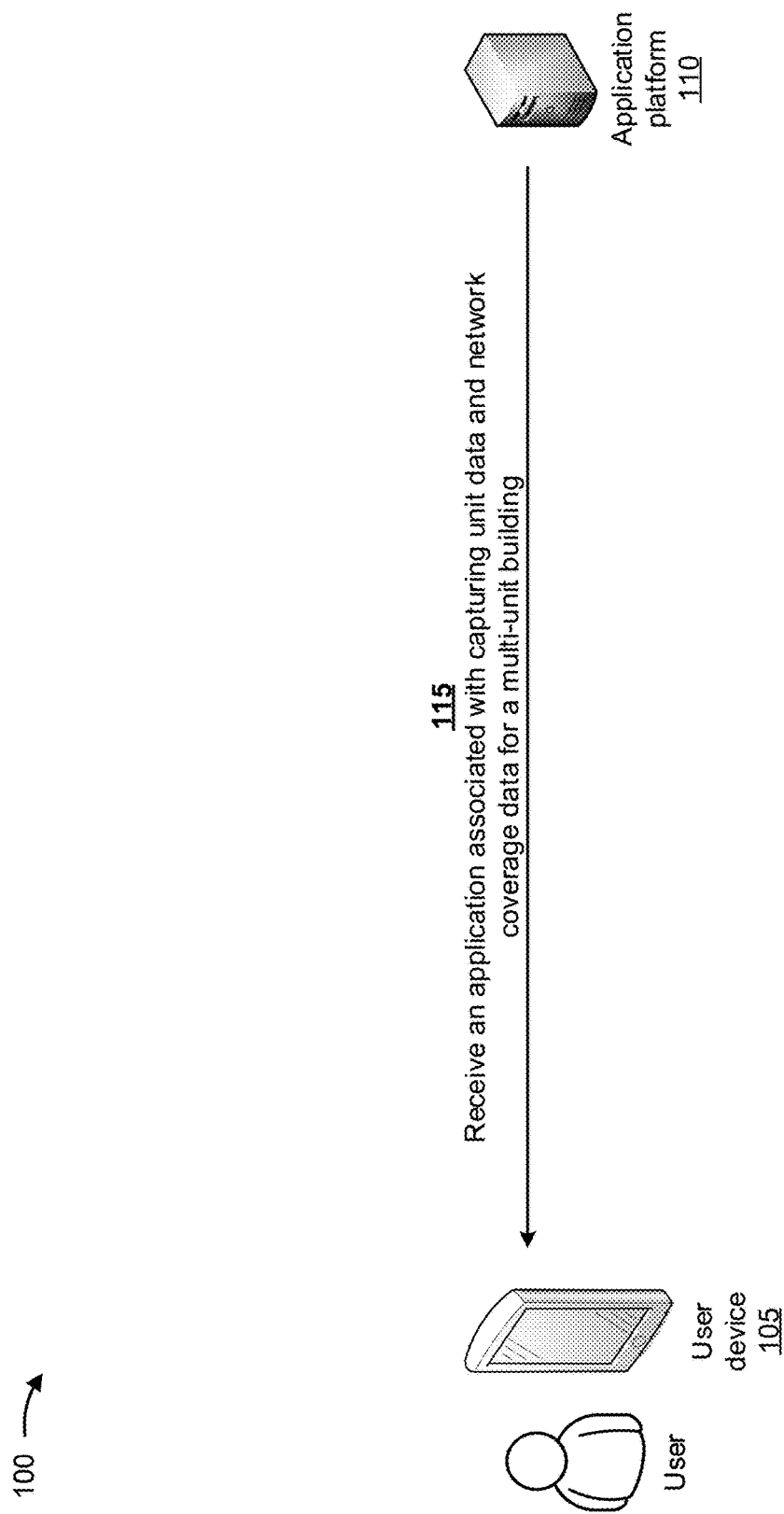

The following detailed description of example implementations refers to the accompanying drawings. The same reference numbers in different drawings may identify the same or similar elements.

A 5G home Internet service is a 5G wireless network service that connects a customer's home with ultra-wide band Internet. Coverage of the wireless network is an important factor for providing a quality network service, such as ultra-fast Internet. Currently, if a customer who lives in an apartment unit or a condominium unit desires ultra-wide band wireless Internet service, a street address of the apartment complex or the condominium complex is qualified for wireless network coverage of the network service. However, a specific apartment unit, condominium unit, a floor number, and/or the like may not be qualified for the wireless network coverage of the network device. This causes false positives (e.g., indicating network coverage) for the network service. Thus, current techniques waste computing resources (e.g., processing resources, memory resources, communication resources, and/or the like), networking resources, human resources, and/or the like by incorrectly qualifying wireless network coverage for a network service, correcting the wireless network coverage for the network service, handling customer complaints associated with the network service, and/or the like.

Some implementations described herein provide a user device, associated with a technician, that qualifies a network service for each unit of a multi-unit building. For example, the user device may capture property data identifying units associated with a multi-unit building, and may import, via an image capture, an image of a floor plan associated with the multi-unit building. The user device may provide the property data to a network device (e.g., a server device) associated with a network that provides network coverage to the multi-unit building, and may receive, from the network device, network coverage data for the multi-unit building based on providing the property data to the network device. The user device may combine the image of the floor plan and the network coverage data to generate an image identifying the floor plan and the network coverage for the multi-unit building, and may capture signal reception data identifying a strength of signal from the network for one or more units of the multi-unit building. The user device may perform one or more actions based on the signal reception data and the image identifying the floor plan and the network coverage for the multi-unit building.

In this way, the user device qualifies a network service for each unit of a multi-unit building, and matches available wireless network coverage for each unit. The user device may update and revalidate the network service for customers when network or power frequency changes occur for the building. Thus, the user device reduces time required to qualify a network service for each unit of a multi-unit building, and conserves computing resources, networking resources, human resources, and/or the like that would otherwise be wasted incorrectly qualifying wireless network coverage for a network service, correcting the wireless network coverage for the network service, handling customer complaints associated with the network service, and/or the like.

FIGS. 1A-1L are diagrams of one or more example implementations 100 described herein. As shown in FIG. 1A, a user device 105 may be associated with a user (e.g., a technician) and an application platform 110. In some implementations, user device 105 may include a mobile device, a computer, a telephone, and/or the like that the user may utilize to provide information to and/or receive information from application platform 110. Application platform 110 may include a platform that supports an application that qualifies a network service for each unit of a multi-unit building. Although implementations are described herein in connection with a multi-unit building, the implementations may also be utilized with a complex of multiple buildings.

As further shown in FIG. 1A, and by reference number 115, user device 105 may receive, from application platform 110, an application associated with capturing unit data and network coverage data for a multi-unit building. In some implementations, the user may utilize user device 105 to download the application from application platform 110, and to install the application. Once user device 105 installs the application, the user may utilize user device 105 to setup the application. For example, the application may request that the user provide credentials (e.g., a user name, a password, an employee number, and/or the like) for accessing the application. In some implementations, the application may enable user device 105 to qualify a network service for each unit of a multi-unit building, as described herein.

Figure 1B:
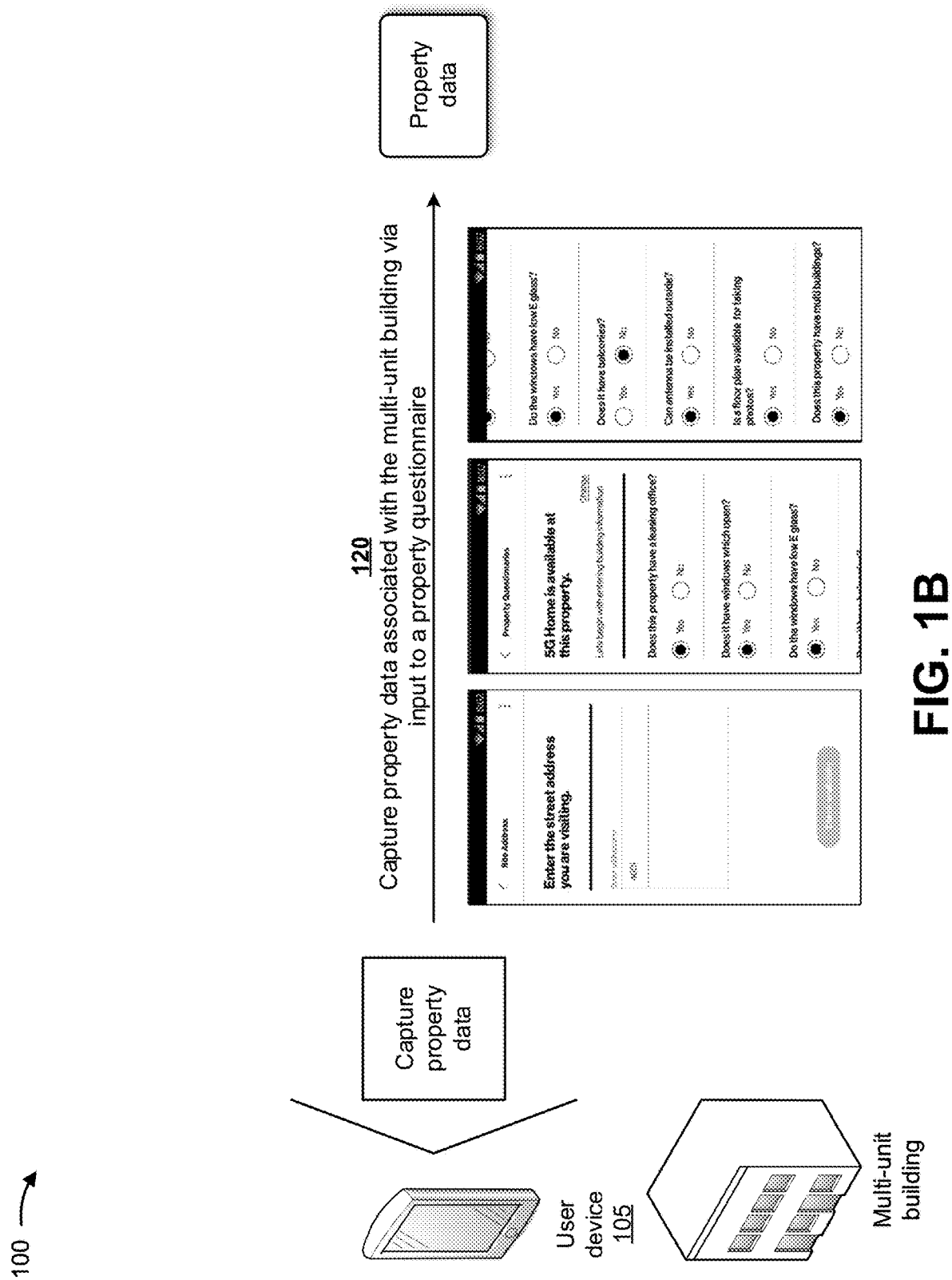

As shown in FIG. 1B, and by reference number 120, user device 105 may capture property data associated with the multi-unit building via input to a property questionnaire. For example, the property questionnaire may be provided via a user interface of user device 105 and may include information requesting the user to enter a street address associated with the multi-unit building, requesting the user to indicate whether the multi-unit building has a leasing office, requesting the user to indicate whether the multi-unit building has windows that open, requesting the user to indicate whether the multi-unit building has low-emissivity (low-E) glass, requesting the user to indicate whether the multi-unit building has balconies, requesting the user to indicate whether an antenna can be installed outside the multi-unit building, requesting the user to indicate whether a floor plan is available, requesting the user to indicate whether the multi-unit building has multiple buildings or multiple floors, and/or the like. In some implementations, the application may cause user device 105 to store the property data in a data structure (e.g., a database, a table, a list, and/or the like) associated with user device 105.

Figure 1C:
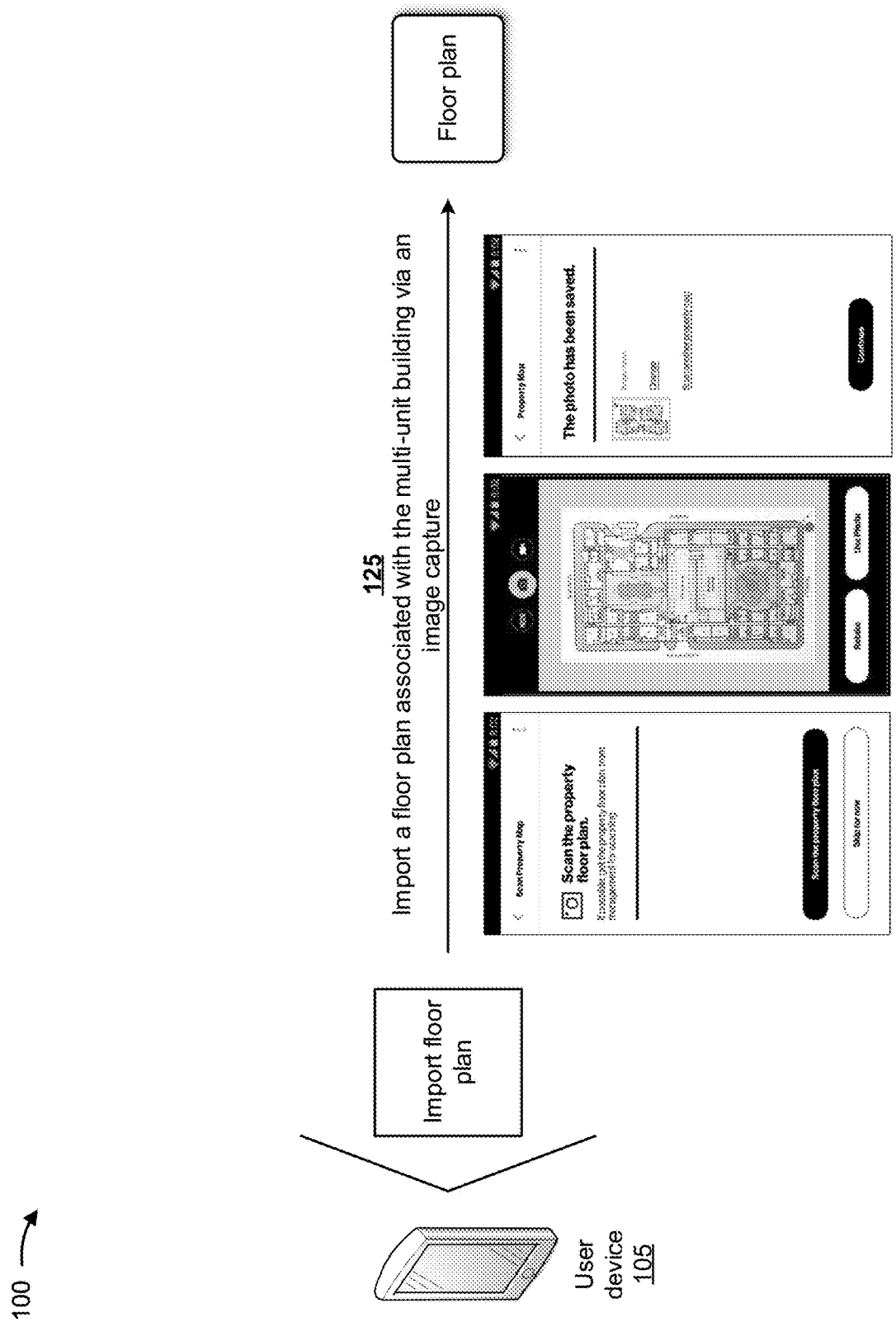

As shown in FIG. 1C, and by reference number 125, user device 105 may import a floor plan associated with the multi-unit building via an image capture. In some implementations, the user may obtain a physical copy of the floor plan (e.g., from the leasing office of the multi-unit building or from a public record), and may utilize a camera of user device 105 to capture an image the physical copy of the floor plan. For example, the application may cause user device 105 to prompt the user to capture an image of the floor plan with the camera of user device 105, and to allow the user to align and capture an image of the floor plan. Alternatively, the user may obtain an existing file of an image of the floor plan (e.g., from a website associated with the multi-unit building, via an email from an individual associated with the multi-unit building, and/or the like). In some implementations, the user may save the image on user device 105 so that the image may be accessible by the application. For example, the user may utilize the application to cause user device 105 to store the image (e.g., as a computer file including image data, metadata, and/or the like) in a data structure (e.g., a database, a table, a list, and/or the like) associated with user device 105.

Figure 1D:
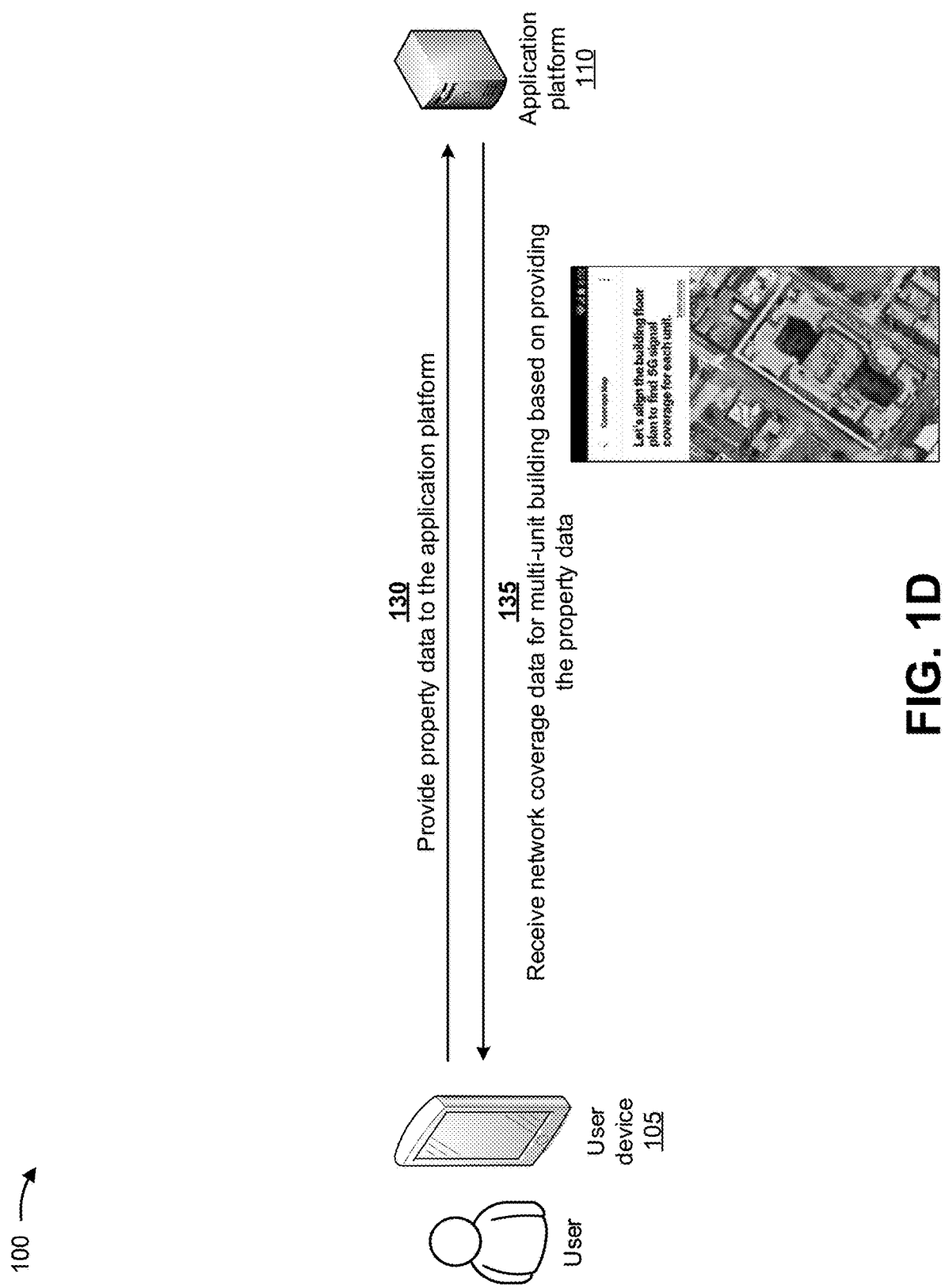

As shown in FIG. 1D, and by reference number 130, user device 105 may provide property data to application platform 110. In some implementations, user device 105 may provide at least a portion of the property data captured via input to the property questionnaire, as described above. For example, user device 105 may provide a street address associated with the multi-unit building to the application platform.

As further shown in FIG. 1D, and by reference number 135, user device 105 may receive, from application platform 110, network coverage data for the multi-unit building based on providing the property data. For example, user device 105 may receive network coverage data for an area associated with the street address associated with the multi-unit building. The network coverage data may indicate where network coverage is available and a strength of the available network coverage within a geographic location of the multi-unit building. For example, the network coverage data may include a network coverage map that includes information illustrating the existence and/or the strength of the network coverage at the geographic location of the multi-unit building, as shown by different lines on the user interface shown in FIG. 1D. For example, a first line may indicate an area where network coverage exists, and a second line may indicate an area where network coverage does not exist. Gradations of the first line may indicate a strength of a network signal in an area corresponding to the first line. In some implementations, the application may cause user device 105 to store the network coverage data in a data structure (e.g., a database, a table, a list, and/or the like) associated with user device 105.

Figure 1E:
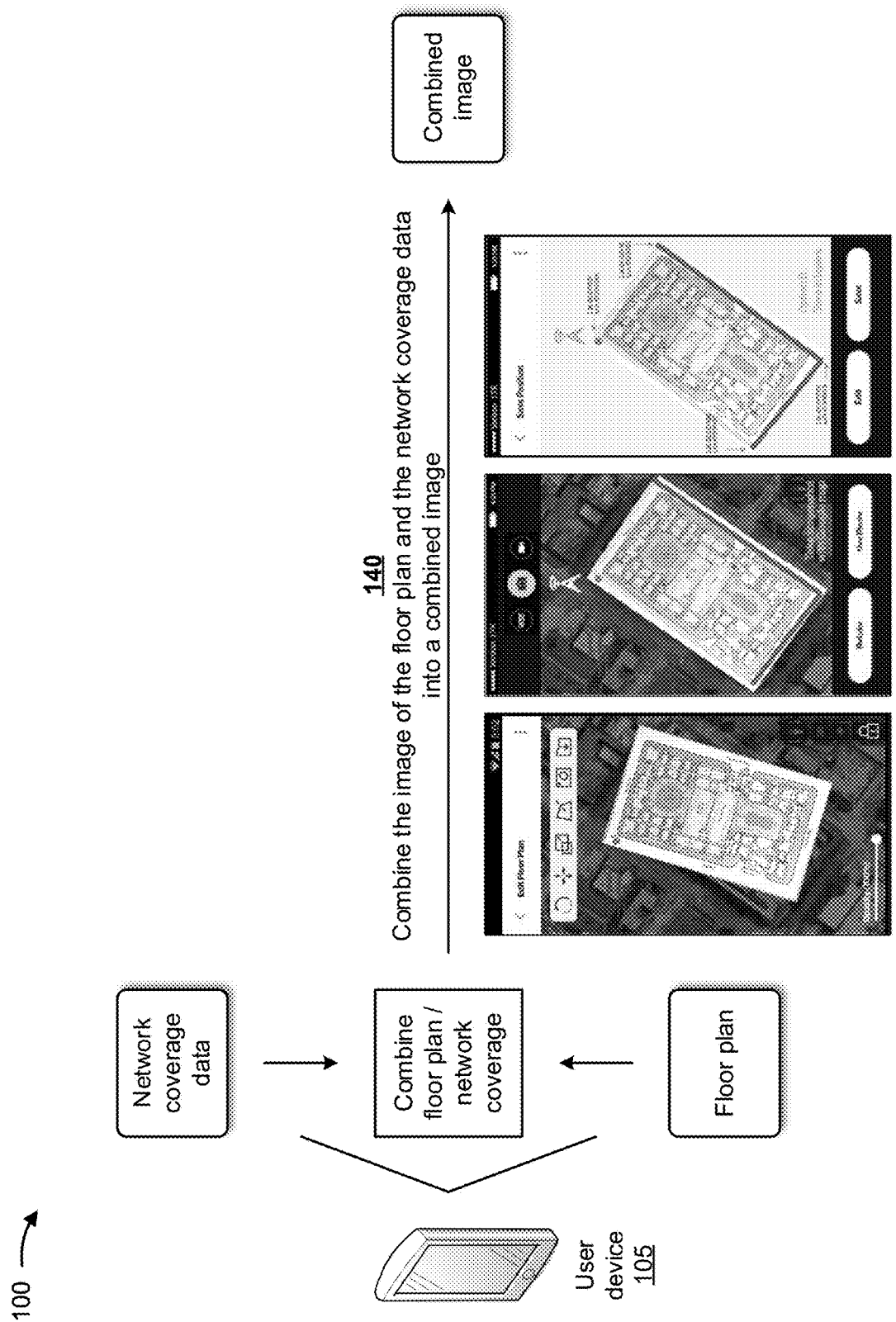

As shown in FIG. 1E, and by reference number 140, user device 105 may combine the image of the floor plan and the network coverage data into a combined image. For example, the network coverage data may include a network coverage map, as described above. The application may cause user device 105 to prompt the user to align the network coverage map with the image of the floor plan, may provide a set of tools by which the user can resize the image of the floor plan or the network coverage map, rotate the image of the floor plan or the network coverage map, modify an opacity of the image of the floor plan or the network coverage map (e.g., such that both the image of the floor plan and the network coverage map are at least partially visible), and/or the like until the image of the floor plan and the network coverage map are aligned and form the combined image. When the image of the floor plan and the network coverage map have been aligned, the user may instruct the application to save the combined image (e.g., a single set of data or as layers of data), and the application may cause user device 105 to store the combined image in a data structure (e.g., a database, a table, a list, and/or the like) associated with user device 105.

Figure 1F:
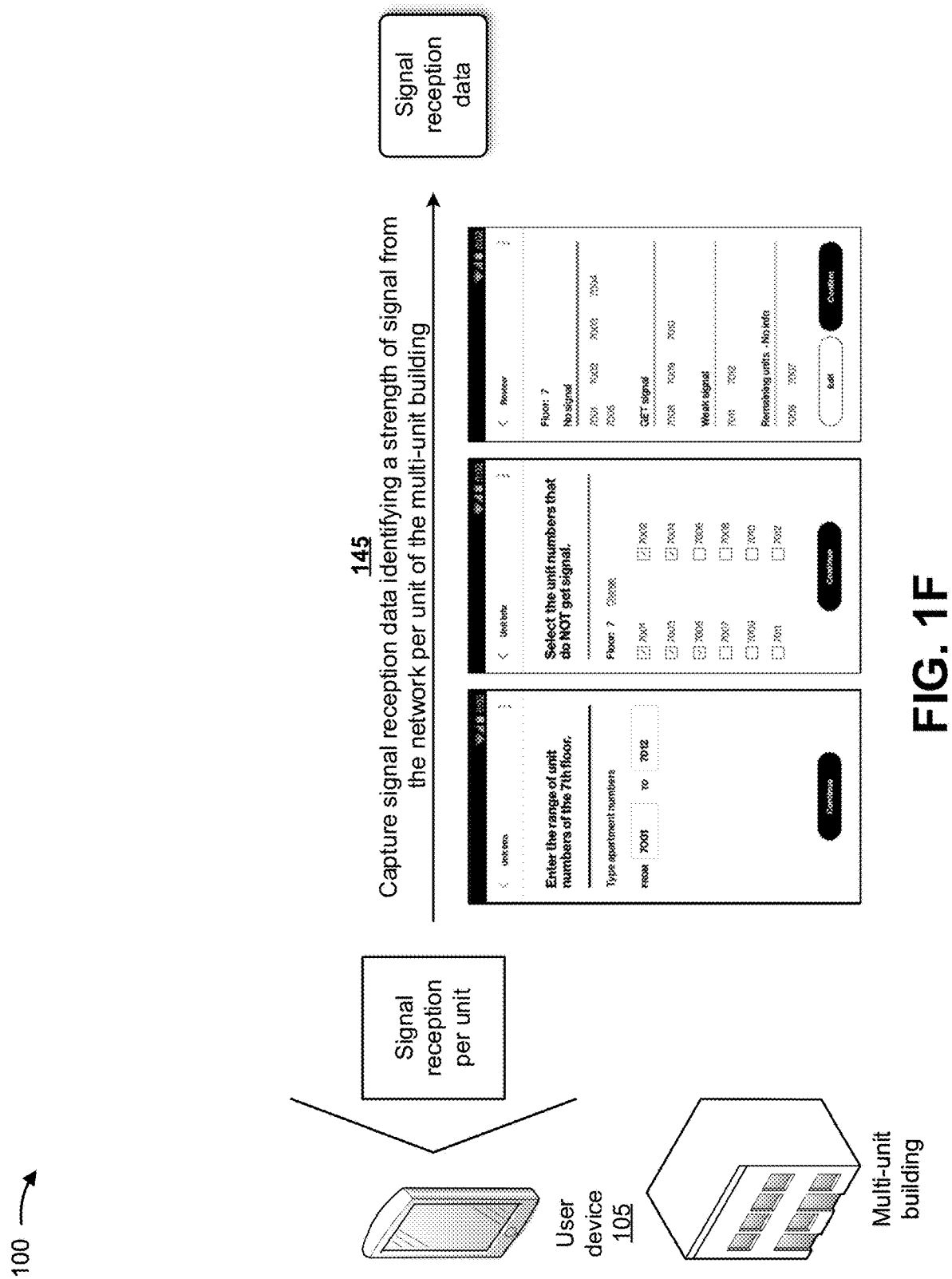

As shown in FIG. 1F, and by reference number 145, user device 105 may capture signal reception data identifying a strength of signal from the network per unit of the multi-unit building. In some implementations, when capturing the signal reception data, user device 105 may capture the signal reception data associated with a location of the user, and may correlate the location of the user with a location on the combined image (e.g., identifying a unit of the multi-unit building). For example, for each unit represented by the image floor plan, the user may take user device 105 to the unit, may measure the strength of the signal from the network, for the unit using user device 105 and/or one or more other devices. The user may provide an indication of the strength of the signal to user device 105 by entering the strength of the signal, or user device 105 may automatically capture and store the strength of the signal in correlation with information identifying the unit.

In some implementations, when capturing the signal reception data, user device 105 may provide a user interface that enables user device 105 to capture signal reception data for multiple units of the multi-unit building. For example, the application may cause user device 105 to prompt the user to enter a range of unit numbers for a particular floor (e.g., as shown in a leftmost user interface of FIG. 1F) and may display a check box for each unit number within the range (e.g., as shown in a middle user interface of FIG. 1F). In some implementations, the application may cause user device 105 to prompt the user to check a box for each unit that receives no signal (e.g., as shown in the middle user interface of FIG. 1F), to check a box for each unit that receives a signal that satisfies a signal strength threshold, and/or to check a box for each unit that receives a signal that does not satisfy the signal strength threshold.

In some implementations, the application may cause user device 105 to display the units in strength of signal categories based on the selections. For example, as shown in a rightmost user interface of FIG. 1F, the application may cause user device 105 to display, for the particular floor, the units that receive no signal (e.g., shown beneath a line labeled "No signal"), the units that receive a signal that satisfies the threshold (e.g., shown beneath a line labeled "GET signal"), the units that receive a signal that does not satisfy the threshold (e.g., shown beneath a line labeled "Weak signal"), and the remaining units for which the strength of signal has not been measured (e.g., shown beneath a line labeled "Remaining units—No info"). In some implementations, the user interface may allow the user to move a unit from one strength of signal category to another strength of signal category, to confirm the selections, and/or the like.

As shown in FIG. 1G, and by reference number 150, user device 105 may provide the signal reception data and the combined image of the image of the floor plan and the network coverage data to application platform 110. In some implementations, the application may cause user device 105 to generate an annotated image that depicts, near each unit, the strength of signal measured for that unit, the strength of signal category selected for that unit, and/or the like, and may provide the annotated image to application platform 110. In some implementations, application platform 110 may store the signal reception data and the combined image of the image of the floor plan and the network coverage data in a data structure (e.g., a database, a table, a list, and/or the like) associated with application platform 110. In some implementations, the data structure may be available, for example, to network engineers and technicians who may make changes to the network based on the information stored in the data structure.

Figure 1H:
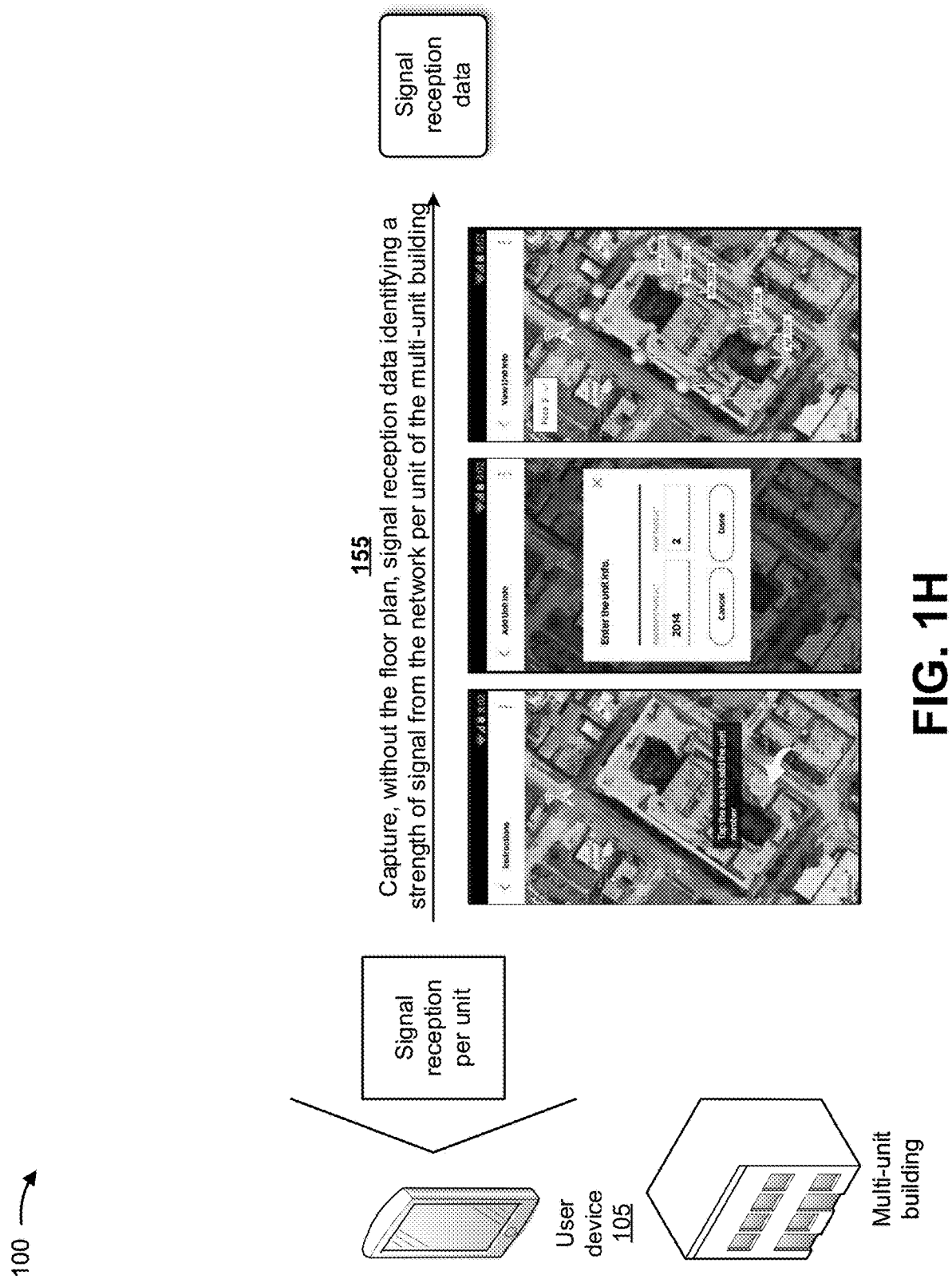

As shown in FIG. 1H, and by reference number 155, user device 105 may capture, without the floor plan, signal reception data identifying a strength of signal from the network per unit of the multi-unit building. In this case, user device 105 may receive the network coverage map for an area of the multi-unit building, as described above in connection with FIG. 1D, and the application may enable the user of user device 105 to specify locations of the units in the multi-unit building. In some implementations, the user may set pins for locations of the units of the multi-unit building via a user interface of user device 105, and may provide, via the user interface, information identifying the units associated with the pins. For example, upon being prompted by the application to identify units that correspond to a particular strength of signal category (e.g., units that do not receive a signal, units that receive a signal that satisfies the threshold, and/or units that receive a signal that does not satisfy the threshold), the user may select each unit by tapping an area on the network coverage map to pin the location of the unit, and may enter a unit number corresponding to the unit (e.g., as shown in a middle user interface of FIG. 1H). The application may cause user device 105 to display the unit number next to the pin at the area indicated, as shown in a rightmost user interface of FIG. 1H.

In some implementations, the application may enable the user to select an entire group of units that correspond to a particular strength of signal category (e.g., a group of units that do not receive a signal, a group of units that receive a signal that satisfies the threshold, or a group of units that receive a signal that does not satisfy a threshold). For example, the user may utilize the user interface to draw a shape around a location of the group of units of the multi-unit building (e.g., that encompasses all units in the group of units), and may provide, via the user interface, information identifying the units associated with the shape (e.g., by entering unit numbers as described above, by entering a unit number range, and/or the like).

Figure 1I:
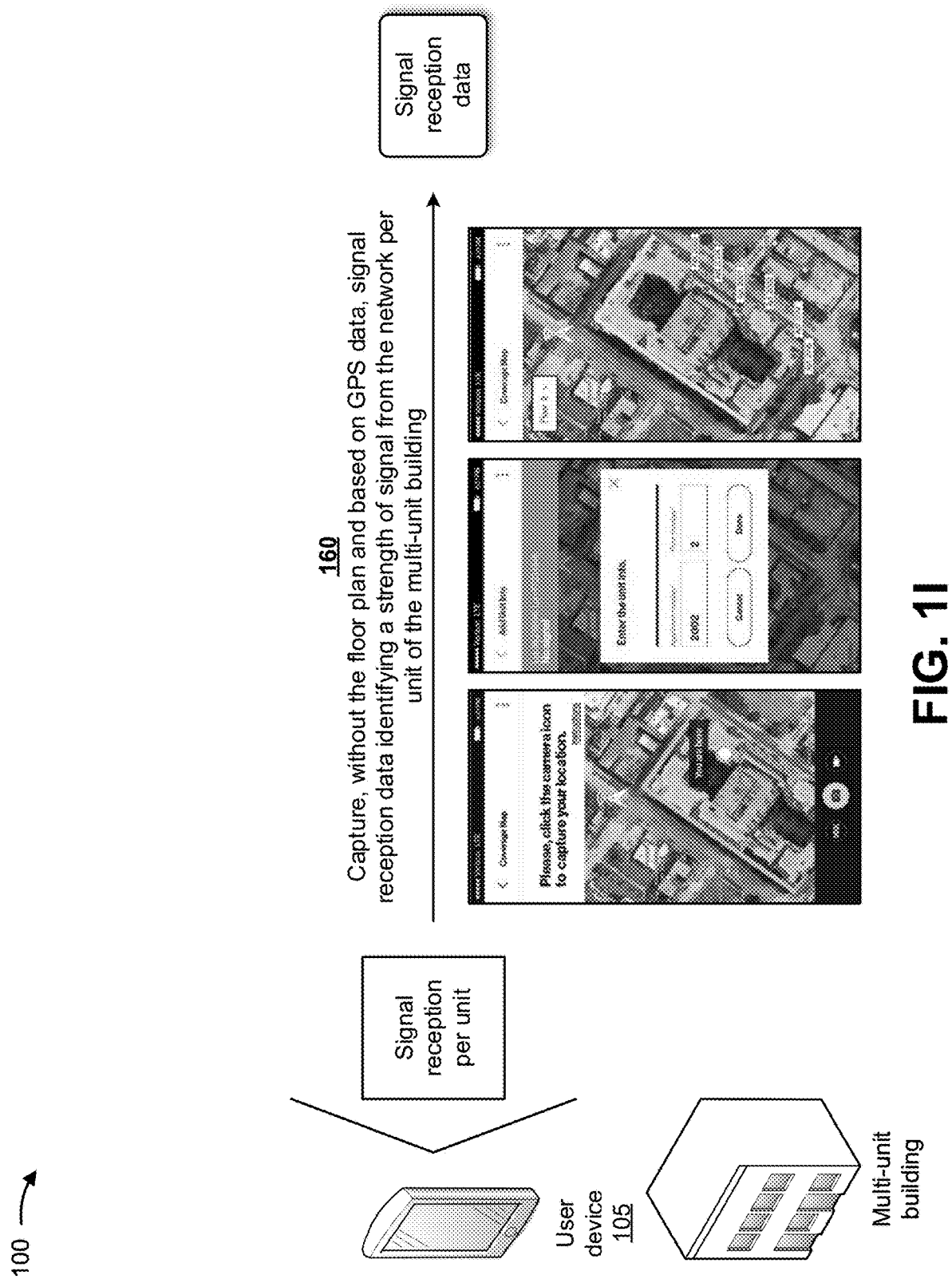

As shown in FIG. 1I, and by reference number 160, user device 105 may capture, without the floor plan and based on global positioning system (GPS) data, signal reception data identifying a strength of signal from the network per unit of the multi-unit building. In some implementations, user device 105 may capture GPS locations associated with the units of the multi-unit building, and may associate the strength of signal for one or more units of the multi-unit building with corresponding ones of the GPS locations to capture the signal reception data. For example, the user of user device 105 may take user device 105 to a location of a unit, and the application may cause user device 105 to prompt the user to select an application (e.g., a camera application) that captures an image of the current GPS coordinates (e.g., the "You are here" location) of user device 105, as shown in a leftmost user interface of FIG. 1I. The application may cause user device 105 to prompt the user to enter the unit number of the unit to be associated with the GPS coordinates, as shown in a middle user interface of FIG. 1I. The application may cause user device 105 to display the unit number next to a marker corresponding to the GPS coordinates, as shown in a rightmost user interface of FIG. 1I.

Figure 1J:
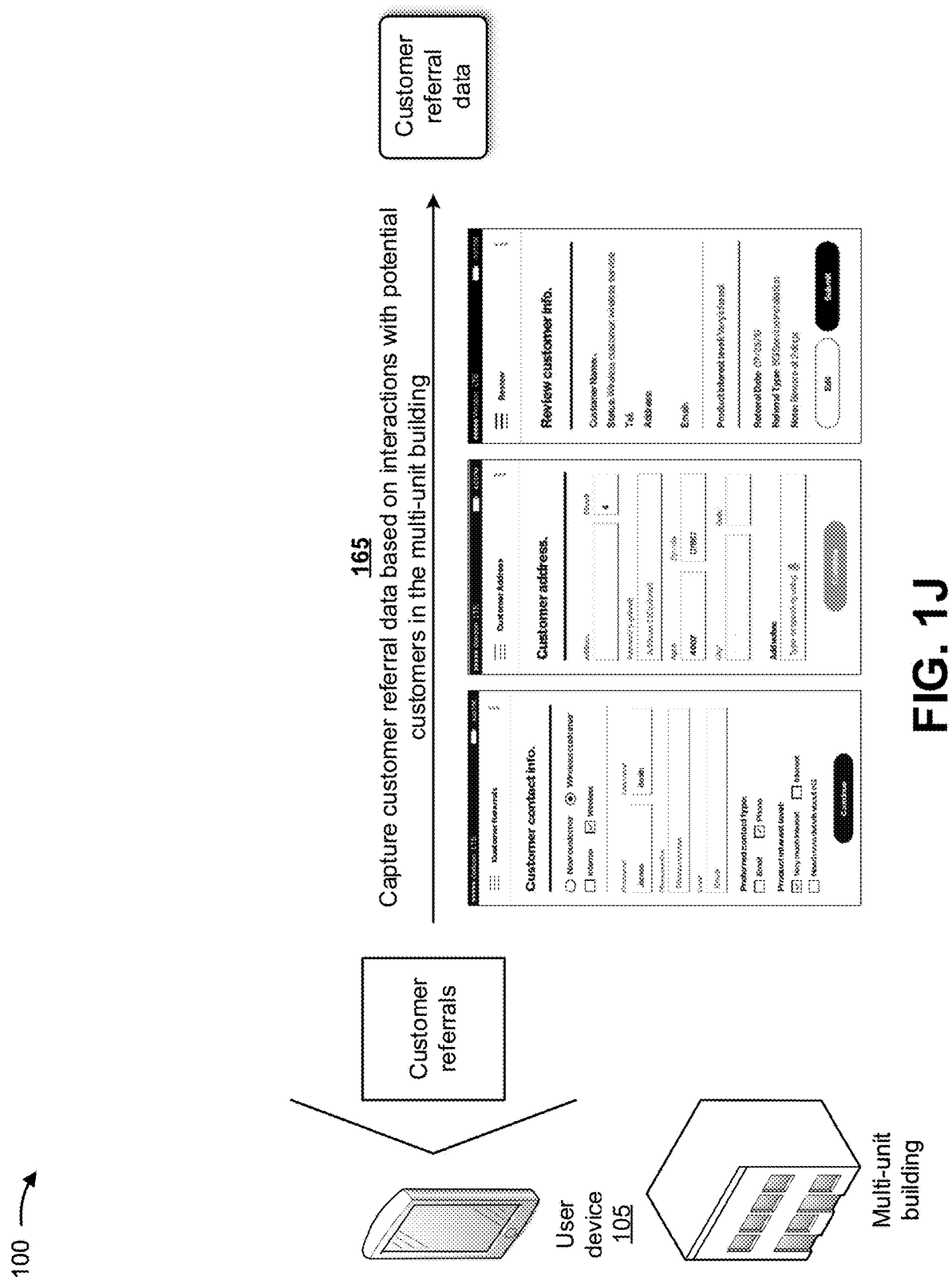

As shown in FIG. 1J, and by reference number 165, user device 105 may capture customer referral data based on interactions with potential customers in the multi-unit building. For example, the application may cause user device 105 to provide a user interface via which the user of user device 105 may provide the customer referral data. In some implementations, the application may obtain a name and contact information of a potential customer, an interest level of the potential customer, a floor and unit number of a unit in the multi-unit building that is associated with the potential customer, a referral type, notes, and/or the like. In some implementations, the application may cause user device 105 to store the customer referral data in a data structure (e.g., a database, a table, a list, and/or the like) associated with user device 105.

Figure 1K:
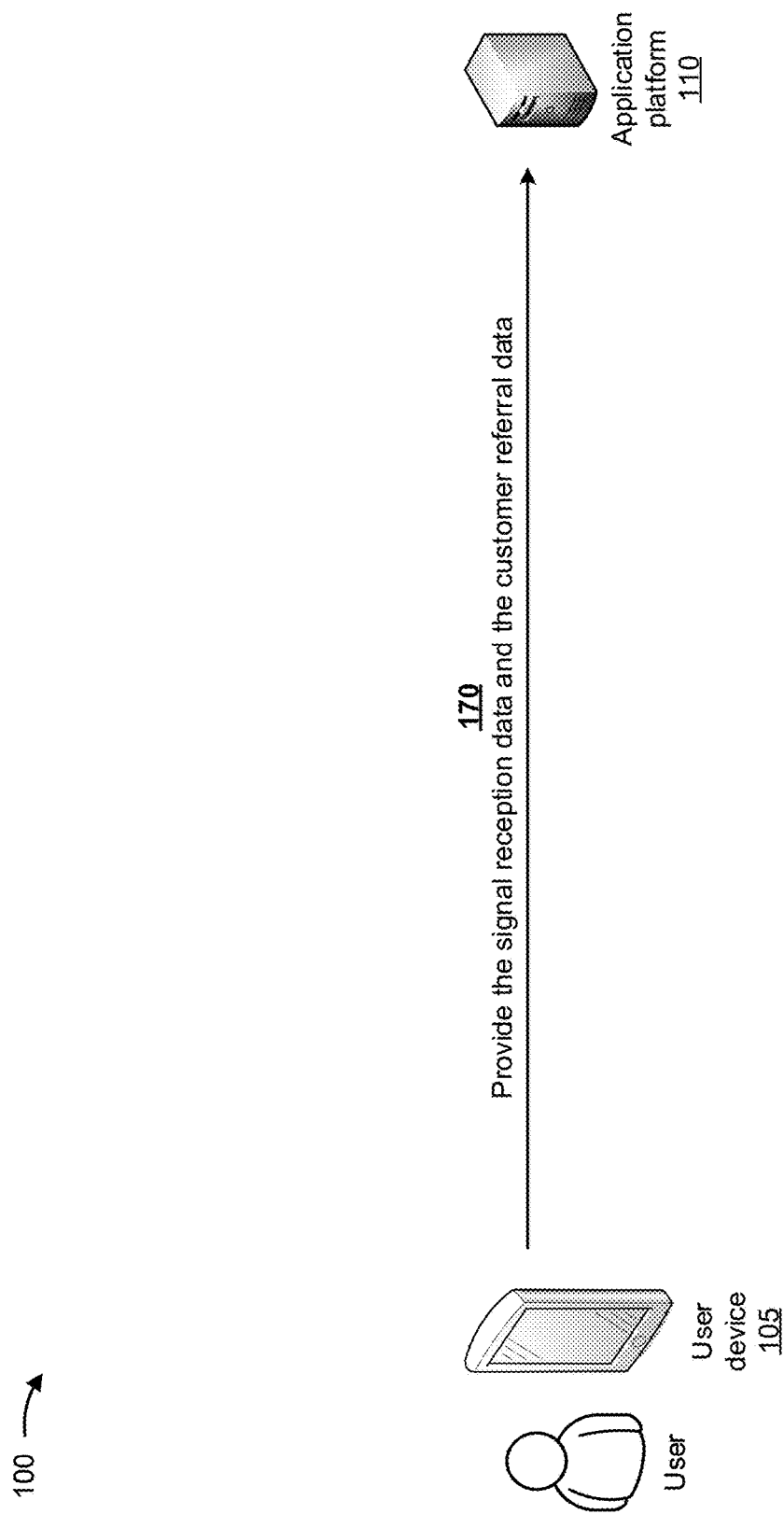

As shown in FIG. 1K, and by reference number 170, user device 105 may provide the signal reception data and the customer referral data to application platform 110. In some implementations, application platform 110 may store the signal reception data and the customer referral data in a data structure (e.g., a database, a table, a list, and/or the like) associated with application platform 110. In some implementations, the data structure may be available, for example, to network engineers and technicians who may make changes to the network based on the information stored in the data structure, to marking personnel to generate offers to potential customers, and/or the like.

Figure 1L:
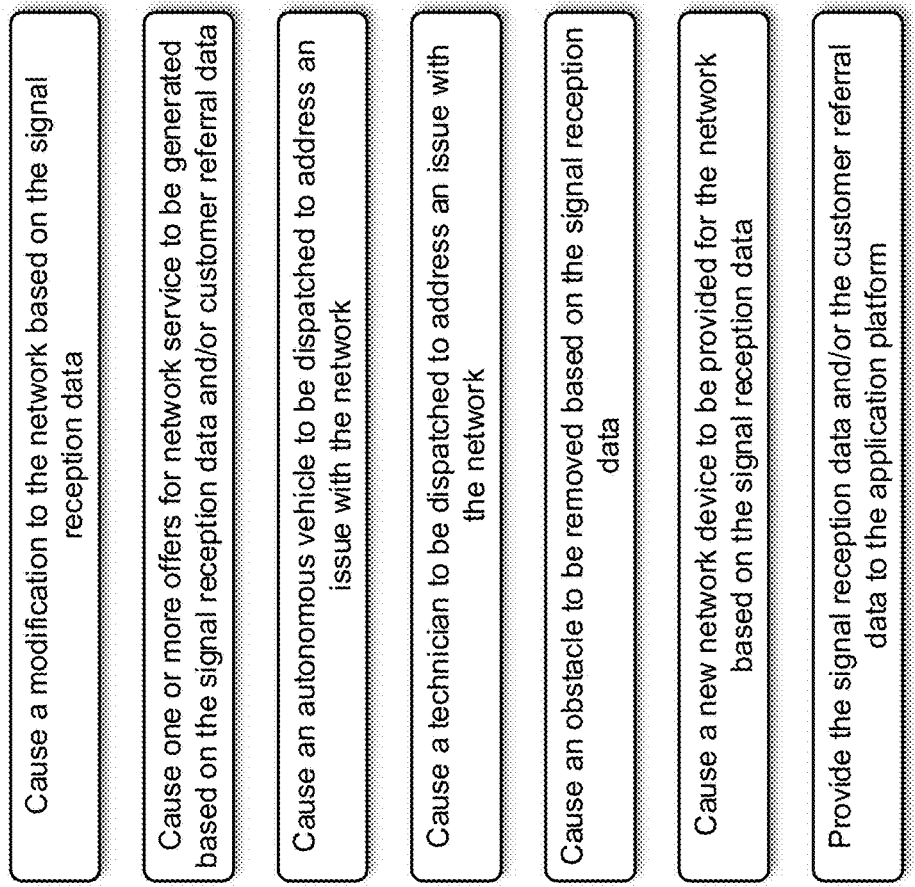

As shown in FIG. 1L, and by reference number 175, user device 105 may perform one or more actions based on the signal reception data and the customer referral data. In some implementations, the one or more actions may include user device 105 causing a modification to the network based on the signal reception data. For example, user device 105 may provide the signal reception data to application platform 110. Application platform 110 may cause one or more additional network devices to be added to the network (e.g., to provide a signal or improve signal reception at a location), may cause one or more existing network devices to be relocated, may cause a signal of one or more existing network devices to be improved, and/or the like. In this way, user device 105 may improve network coverage for the multi-unit building, thereby improving speed and efficiency of the network and conserving resources that would otherwise be wasted compensating for poor or nonexistent coverage for one or more units of the multi-unit building, and/or the like.

In some implementations, the one or more actions may include user device 105 causing one or more offers for network service to be generated based on the signal reception data and/or customer referral data. In this way, user device 105 may enable a network provider to leverage interaction, between a user of user device 105 and potential customers associated with units in the multi-unit building, to incentivize the potential customers to purchase network services, thereby conserving computing resources, networking resources, and/or the like that would otherwise be wasted identifying potential customers, contacting potential customers, and/or the like.

In some implementations, the one or more actions may include user device 105 causing an autonomous vehicle to be dispatched to address an issue with the network. For example, user device 105 may cause a robot, an unmanned aerial vehicle (UAV), and/or the like to be dispatched to install, modify, or repair a network device, to remove or minimize an obstacle that affects a signal to one or more units of the multi-unit building, and/or the like. In this way, user device 105 may automatically improve network coverage for the multi-unit building, thereby conserving resources that would otherwise be wasted addressing the network issue.

In some implementations, the one or more actions may include user device 105 causing a technician to be dispatched to address an issue with the network. For example, user device 105 may cause a technician to be dispatched to install, modify, or repair a network device, to remove or minimize an obstacle that affects a signal to one or more units of the multi-unit building, and/or the like. In this way, user device 105 may quickly and efficiently arrange and dispatch personnel necessary to improve network coverage for the multi-unit building, thereby conserving resources that would otherwise be wasted arranging for and dispatching the personnel.

In some implementations, the one or more actions may include user device 105 causing an obstacle to be removed based on the signal reception data. For example, user device 105 may cause vegetation (e.g., a tree, a plant, a shrub, a vine, and/or the like) to be removed or minimized (e.g., trimmed), may cause an object or structure (e.g., a sign, a shed, a trash container, and/or the like) to be removed or relocated, and/or the like. In this way, user device 105 may automatically identify and arrange for removal of an obstacle that will allow and/or improve network coverage to one or more units of the multi-unit building, thereby conserving resources that would otherwise be wasted identifying the obstacle, determining what action needs to be taken to remove the obstacle, arranging for removal of the obstacle, and/or the like.

In some implementations, the one or more actions may include user device 105 causing a new network device to be provided for the network based on the signal reception data. For example, user device 105 may cause a network provider to provide a new network device in order to provide a signal to one or more units of the multi-unit building that do not receive a signal or receive a weak signal (e.g., based on the signal reception data, and/or the like). In this way, user device 105 may improve network coverage to one or more units of the multi-unit building.

In some implementations, the one or more actions may include user device 105 providing the signal reception data and/or the customer referral data to the application platform. In this way, user device 105 may enable the application platform to more efficiently manage and maintain the network, to provide the signal reception data and/or the customer referral data to technicians associated with the network, to sales personnel associated with the network, and/or the like.

In this way, several different stages of the process for qualifying a network service for each unit of a multi-unit building are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that qualifies a network service for each unit of a multi-unit building in the manner described herein. Finally, the process for qualifying a network service for each unit of a multi-unit building reduces time required to qualify a network service for each unit of a multi-unit building, and conserves computing resources, networking resources, human resources, and/or the like that would otherwise be wasted incorrectly qualifying wireless network coverage for a network service, correcting the wireless network coverage for the network service, handling customer complaints associated with the network service, and/or the like.

As indicated above, FIGS. 1A-1L are provided merely as examples. Other examples may differ from what was described with regard to FIGS. 1A-1L. The number and arrangement of devices and networks shown in FIGS. 1A-1L are provided as an example. In practice, there may be additional devices and/or networks, fewer devices and/or networks, different devices and/or networks, or differently arranged devices and/or networks than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) of FIGS. 1A-1L may perform one or more functions described as being performed by another set of devices of FIGS. 1A-1L.

Figure 2:
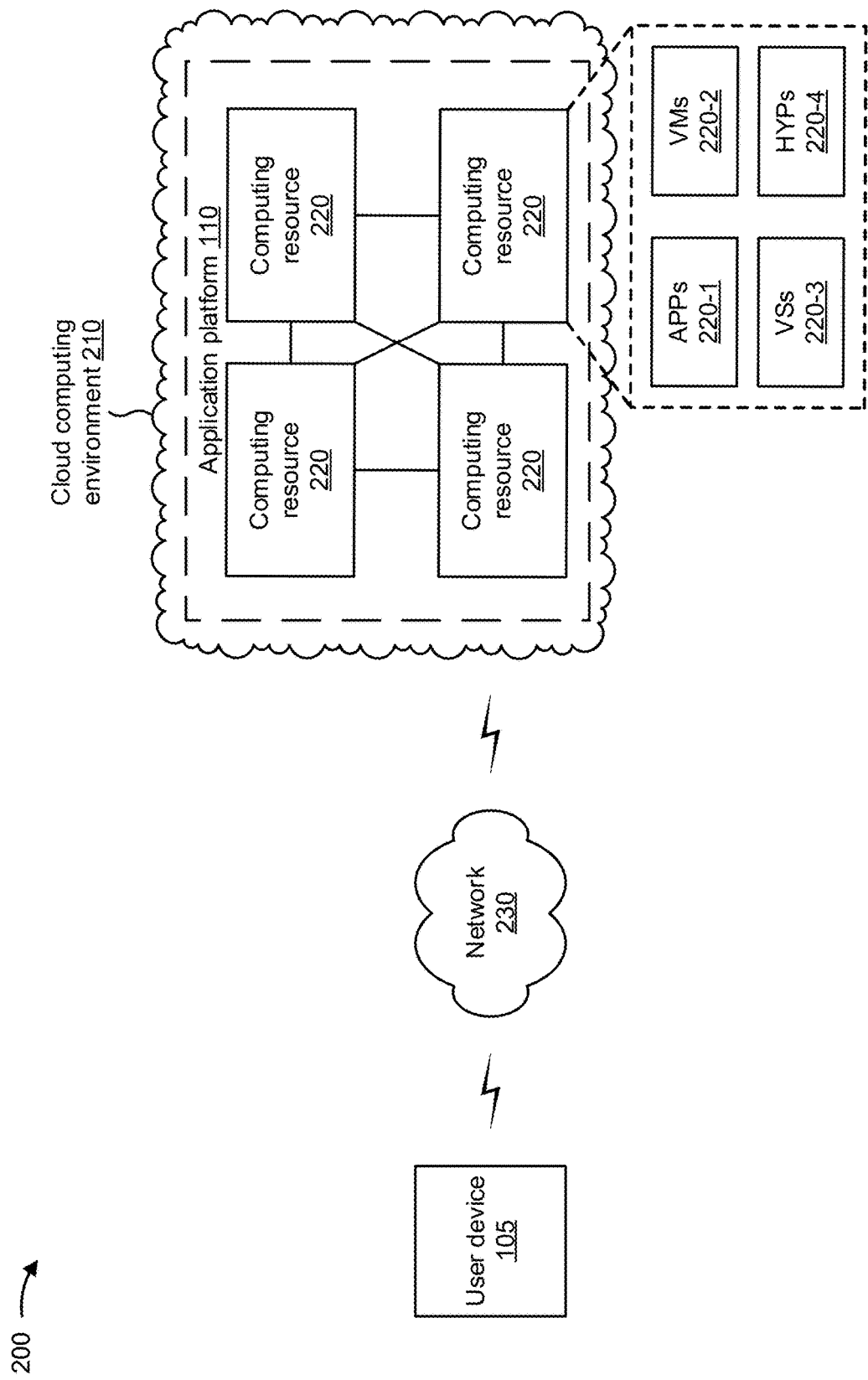
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, application platform 110, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to application platform 110.

Application platform 110 includes one or more devices that provide an application for qualifying a network service for each unit of a multi-unit building. In some implementations, application platform 110 may be designed to be modular such that certain software components may be swapped in or out depending on a particular need. As such, application platform 110 may be easily and/or quickly reconfigured for different uses. In some implementations, application platform 110 may receive information from and/or transmit information to one or more user devices 105.

In some implementations, as shown, application platform 110 may be hosted in a cloud computing environment 210. Notably, while implementations described herein describe application platform 110 as being hosted in cloud computing environment 210, in some implementations, application platform 110 may not be cloud-based (i.e., may be implemented outside of a cloud computing environment) or may be partially cloud-based.

Cloud computing environment 210 includes an environment that hosts application platform 110. Cloud computing environment 210 may provide computation, software, data access, storage, etc., services that do not require end-user knowledge of a physical location and configuration of system(s) and/or device(s) that hosts application platform 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host application platform 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with application platform 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of application platform 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
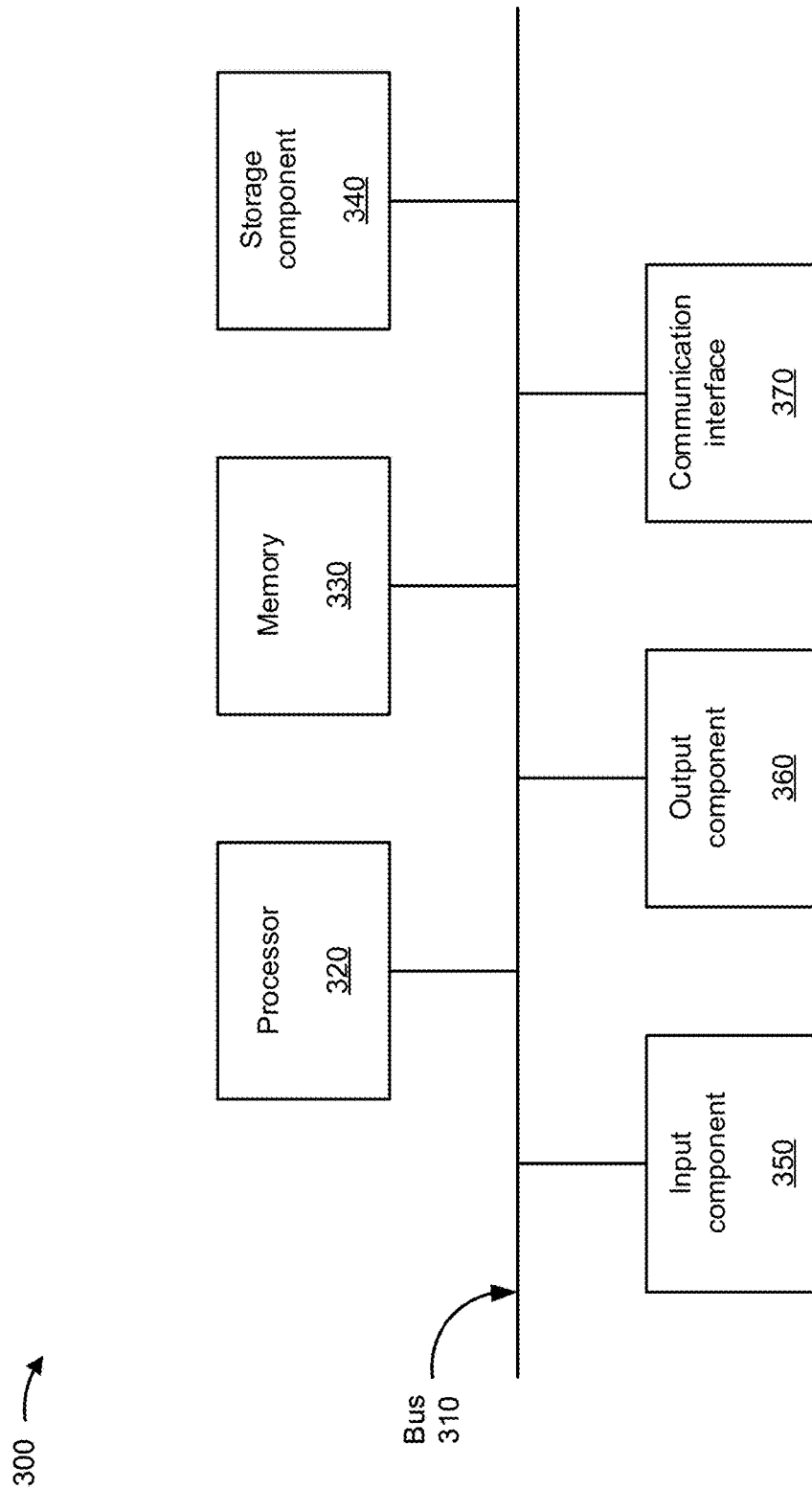
FIG. 3 is a diagram of example components of one or more devices of FIG. 2.

FIG. 3 is a diagram of example components of a device 300. Device 300 may correspond to user device 105, application platform 110, and/or computing resource 220. In some implementations, user device 105, application platform 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
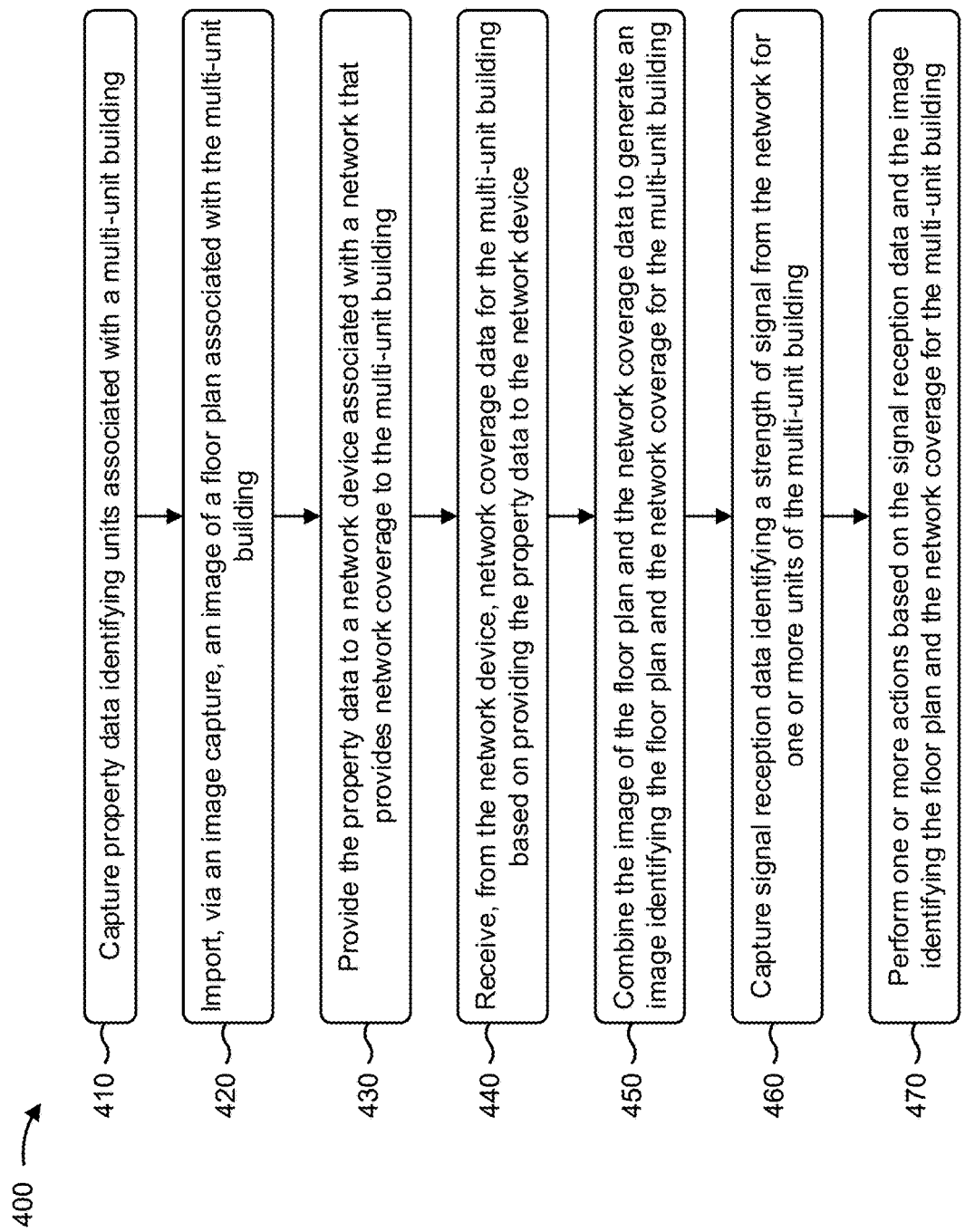
FIG. 4 is a flow chart of an example process for qualifying a network service for each unit of a multi-unit building.

FIG. 4 is a flow chart of an example process 400 for qualifying a network service for each unit of a multi-unit building. In some implementations, one or more process blocks of FIG. 4 may be performed by a device (e.g., user device 105). In some implementations, one or more process blocks of FIG. 4 may be performed by another device or a group of devices separate from or including the device, such as an application platform (e.g., application platform 110).

As shown in FIG. 4, process 400 may include capturing property data identifying units associated with a multi-unit building (block 410). For example, the device (e.g., using processor 320, input component 350, and/or the like) may capture property data identifying units associated with a multi-unit building, as described above. In some implementations, capturing the property data identifying the units associated with the multi-unit building may include capturing the property data via input to a property questionnaire.

As further shown in FIG. 4, process 400 may include importing, via an image capture, an image of a floor plan associated with the multi-unit building (block 420). For example, the device (e.g., using processor 320, input component 350, communication interface 370, and/or the like) may import, via an image capture, an image of a floor plan associated with the multi-unit building, as described above.

As further shown in FIG. 4, process 400 may include providing the property data to a network device associated with a network that provides network coverage to the multi-unit building (block 430). For example, the device (e.g., using processor 320, memory 330, communication interface 370, and/or the like) may provide the property data to a network device associated with a network that provides network coverage to the multi-unit building, as described above. The network may include a fifth generation (5G) wireless network that provides a network service.

As further shown in FIG. 4, process 400 may include receiving, from the network device, network coverage data for the multi-unit building based on providing the property data to the network device (block 440). For example, the device (e.g., using processor 320, storage component 340, communication interface 370, and/or the like) may receive, from the network device, network coverage data for the multi-unit building based on providing the property data to the network device, as described above.

As further shown in FIG. 4, process 400 may include combining the image of the floor plan and the network coverage data to generate an image identifying the floor plan and the network coverage for the multi-unit building (block 450). For example, the device (e.g., using processor 320, memory 330, and/or the like) may combine the image of the floor plan and the network coverage data to generate an image identifying the floor plan and the network coverage for the multi-unit building, as described above.

As further shown in FIG. 4, process 400 may include capturing signal reception data identifying a strength of signal from the network for one or more units of the multi-unit building (block 460). For example, the device (e.g., using processor 320, input component 350, communication interface 370, and/or the like) may capture signal reception data identifying a strength of signal from the network for one or more units of the multi-unit building, as described above. The strength of signal may include data indicating one of no signal is received from the network, a first signal is received from the network, or a second signal is received from the network.

In some implementations, capturing the signal reception data may include capturing the signal reception data based on the image identifying the floor plan and the network coverage for the multi-unit building.

In some implementations, capturing the signal reception data may include manipulating a user interface that identifies the network coverage for the multi-unit building to capture the signal reception data. In some implementations, manipulating the user interface may include receiving pins for locations of the units of the multi-unit building via the user interface, and receiving, via the user interface, information identifying the units associated with the pins. In some implementations, manipulating the user interface may include receiving shapes drawn around locations of the units of the multi-unit building via the user interface, and receiving, via the user interface, information identifying the units associated with the shapes.

In some implementations, capturing the signal reception data may include capturing global positioning system (GPS) locations associated with the units of the multi-unit building, and associating the strength of signal from the network for one or more units of the multi-unit building with corresponding ones of the GPS locations to capture the signal reception data.

As further shown in FIG. 4, process 400 may include performing one or more actions based on the signal reception data and the image identifying the floor plan and the network coverage for the multi-unit building (block 470). For example, the device (e.g., using processor 320, memory 330, storage component 340, communication interface 370, and/or the like) may perform one or more actions based on the signal reception data and the image identifying the floor plan and the network coverage for the multi-unit building, as described above. In some implementations, performing the one or more actions may include causing a modification to the network based on the signal reception data; causing an autonomous vehicle to be dispatched to address an issue with the network; or causing a technician to be dispatched to address an issue with the network.

In some implementations, performing the one or more actions may include causing an obstacle to be removed based on the signal reception data; causing a new network device to be provided for the network based on the signal reception data; or providing the signal reception data to the network device.

Process 400 may include additional implementations, such as any single implementation or any combination of implementations described below and/or in connection with one or more other processes described elsewhere herein.

In some implementations, process 400 may include receiving, prior to capturing the property data, an application that enables the device to at least capture the property data, import the image of the floor plan, combine the image of the floor plan and the network coverage data, capture the signal reception data, and perform the one or more actions.

In some implementations, process 400 may include capturing customer referral data based on interactions with potential customers in the multi-unit building, and causing one or more offers for a network service to be generated, for the potential customers, based on the customer referral data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
capturing, by a user device and from user input associated with the user device, property data identifying units associated with a multi-unit building;
importing, by the user device and via an image capture, an image of a floor plan associated with the multi-unit building;
providing, by the user device, the captured property data to a network device associated with a network that provides wireless network coverage to the multi-unit building;
receiving, by the user device and from the network device, network coverage data for the multi-unit building based on providing the captured property data to the network device;
combining, by the user device, the imported image of the floor plan and the network coverage data to generate a combined image identifying the floor plan and the wireless network coverage for the multi-unit building;
capturing, by the user device, signal reception data identifying a strength of signal from the network for one or more units of the multi-unit building for a particular floor, wherein a strength of signal of each unit, of the one or more units, is measured in real-time by the user device;
providing, by the user device and for display via a display user interface, information identifying the strength of signal of each unit according to a strength of signal category,
wherein the strength of signal category includes information identifying units as:
receiving no signal,
receiving a signal that satisfies a signal strength threshold, or
receiving a signal that does not satisfy the signal strength threshold; and
wherein the display user interface is configured to allow a user to move a representation of a particular unit of the particular floor into another strength of signal category different from a current strength of signal category; and
performing, by the user device, one or more actions based on the signal reception data and the combined image identifying the floor plan and the wireless network coverage for the multi-unit building.

2. The method of claim 1, further comprising:
receiving, prior to capturing the property data, information from an application that enables the user device to at least:
capture the property data,
import the image of the floor plan,
combine the image of the floor plan and the network coverage data,
capture the signal reception data, and
perform the one or more actions.

3. The method of claim 1, wherein performing the one or more actions comprises one or more of:
causing a modification to the network based on the signal reception data;
causing an autonomous vehicle to be dispatched to address a first network issue with the network; or
causing a technician to be dispatched to address a second network issue with the network.

4. The method of claim 1, wherein performing the one or more actions comprises one or more of:
identifying an obstacle to be removed based on the signal reception data;
causing a new network device to be provided for the network based on the signal reception data; or
providing the signal reception data to the network device.

5. The method of claim 1, further comprising:
capturing customer referral data based on interactions with potential customers in the multi-unit building; and
causing one or more offers for a network service to be generated, for the potential customers, based on the customer referral data.

6. The method of claim 1, wherein the strength of signal includes data indicating one of:
no signal is received from the network,
a first signal is received from the network, or
a second signal is received from the network,
wherein the first signal is associated with a strength that is greater than a strength of the second signal.

7. The method of claim 1, wherein capturing the property data identifying the units associated with the multi-unit building comprises:
capturing the property data via input to a property questionnaire.

8. A user device, comprising:
one or more memories; and
one or more processors, communicatively coupled to the one or more memories, configured to:
capture, from user input associated with the user device, property data identifying units associated with a multi-unit building;
import, via an image capture, an image of a floor plan associated with the multi-unit building;
provide the property data to a network device associated with a network that provides network coverage to the multi-unit building;
receive, from the network device, network coverage data for the multi-unit building based on providing the property data to the network device;
combine the image of the floor plan and the network coverage data to generate a combined image identifying the floor plan and the network coverage for the multi-unit building;
capture signal reception data identifying a strength of signal from the network for one or more units of the multi-unit building for a particular floor,
wherein a strength of signal of each unit, of the one or more units, is measured in real-time by the user device;
provide, for display via a display user interface, information identifying the strength of signal of each unit according to a strength of signal category,
wherein the strength of signal category includes information identifying units as:
receiving no signal,
receiving a signal that satisfies a signal strength threshold, or
receiving a signal that does not satisfy the signal strength threshold; and
wherein the display user interface is configured to allow a user to move a representation of a particular unit of the particular floor into a another strength of signal category different from a current strength of signal category; and
cause a network plan to be generated for the multi-unit building based on the signal reception data and the combined image identifying the floor plan and the network coverage for the multi-unit building.

9. The user device of claim 8, wherein the one or more processors, when capturing the signal reception data, are configured to:
capture the signal reception data based on the combined image identifying the floor plan and the network coverage for the multi-unit building.

10. The user device of claim 8, wherein the one or more processors, when capturing the signal reception data, are configured to:
manipulate the display user interface that identifies the network coverage for the multi-unit building to capture the signal reception data.

11. The user device of claim 10, wherein the one or more processors, when manipulating the display user interface, are configured to:
receive inputs representing pins for locations of the units of the multi-unit building via the display user interface; and
receive, via the display user interface, information identifying the units associated with the inputs representing pins.

12. The user device of claim 10, wherein the one or more processors, when manipulating the display user interface, are configured to:
- receive inputs representing shapes drawn around locations of the units of the multi-unit building via the display user interface; and
- receive, via the display user interface, information identifying the units associated with the inputs representing shapes.

13. The user device of claim 8, wherein the one or more processors, when capturing the signal reception data, are configured to:
- capture global positioning system (GPS) locations associated with the units of the multi-unit building; and
- associate the strength of signal from the network for the one or more units of the multi-unit building with corresponding ones of the GPS locations to capture the signal reception data.

14. The user device of claim 8, wherein the network includes a fifth generation (5G) wireless network that provides a network service.

15. A non-transitory computer-readable medium storing instructions, the instructions comprising:
- one or more instructions that, when executed by one or more processors, cause the one or more processors of a user device to:
  - capture, from user input associated with the user device, property data identifying units associated with a multi-unit building;
  - import, via an image capture, an image of a floor plan associated with the multi-unit building;
  - provide the property data to a network device associated with a network that provides network coverage to the multi-unit building;
  - receive, from the network device, network coverage data for the multi-unit building based on providing the property data to the network device;
  - combine the image of the floor plan and the network coverage data to generate a combined image identifying the floor plan and the network coverage for the multi-unit building;
  - capture signal reception data identifying a strength of signal from the network for one or more units of the multi-unit building for a particular floor,
    - wherein a strength of signal of each unit, of the one or more units, is measured in real-time by the user device;
  - provide, for display via a display user interface, information identifying the strength of signal of each unit according to a strength of signal category,
    - wherein the strength of signal category includes information identifying units as:
      - receiving no signal,
      - receiving a signal that satisfies a signal strength threshold, or
      - receiving a signal that does not satisfy the signal strength threshold; and
    - wherein the display user interface is configured to allow a user to move a representation of a particular unit of the particular floor into a another strength of signal category different from a current strength of signal category; and
  - perform one or more actions based on the signal reception data and the combined image identifying the floor plan and the network coverage for the multi-unit building,
    - wherein the one or more instructions, that cause the one or more processors to perform the one or more actions, cause the one or more processors to one or more of:
      - cause a modification to the network based on the signal reception data,
      - cause an autonomous vehicle to be dispatched to address a first network issue with the network,
      - cause a technician to be dispatched to address a second network issue with the network,
      - identify an obstacle to be removed based on the signal reception data,
      - identify a new network device to be provided for the network based on the signal reception data, or provide the signal reception data to the network device.

16. The non-transitory computer-readable medium of claim 15, wherein the instructions further comprise:
- one or more instructions that, when executed by the one or more processors, cause the one or more processors to:
  - capture customer referral data based on interactions with potential customers in the multi-unit building; and
  - cause one or more offers for a network service to be generated, for the potential customers, based on the customer referral data.

17. The non-transitory computer-readable medium of claim 15, wherein the strength of signal includes data indicating one of:
- no signal is received from the network,
- a first signal is received from the network, or
- a second signal is received from the network,
  - wherein the first signal includes a strength that is greater than a strength of the second signal.

18. The non-transitory computer-readable medium of claim 15, wherein the one or more instructions, that cause the one or more processors to capture the property data identifying the units associated with the multi-unit building, cause the one or more processors to:
- capture the property data via input to a property questionnaire.

19. The non-transitory computer-readable medium of claim 15, wherein the one or more instructions, that cause the one or more processors to capture the signal reception data, cause the one or more processors to:
- capture the signal reception data based on the combined image identifying the floor plan and the network coverage for the multi-unit building.

20. The non-transitory computer-readable medium of claim 15, wherein the one or more instructions, that cause the one or more processors to capture the signal reception data, cause the one or more processors to:
- capture global positioning system (GPS) locations of the units of the multi-unit building; and
- associate the strength of signal from the network for one or more units of the multi-unit building with corresponding ones of the GPS locations to capture the signal reception data.

* * * * *